United States Patent
Kang et al.

(10) Patent No.: US 9,685,247 B2
(45) Date of Patent: Jun. 20, 2017

(54) RADIATION PROTECTION DEVICE

(71) Applicants: Tsinghua University, Haidian District, Beijing (CN); Nuctech Company Limited, Haidian District, Beijing (CN)

(72) Inventors: Kejun Kang, Beijing (CN); Yuanjing Li, Beijing (CN); Ying Li, Beijing (CN); Jianmin Li, Beijing (CN); Junli Li, Beijing (CN); Yanli Deng, Beijing (CN)

(73) Assignees: Tsinghua University, Haidian District, Beijing (CN); Nuctech Company Limited, Haidian District, Beijing (CN)

( * ) Notice: Subject to any disclaimer, the term of this patent is extended or adjusted under 35 U.S.C. 154(b) by 358 days.

(21) Appl. No.: 14/459,408

(22) Filed: Aug. 14, 2014

(65) Prior Publication Data

US 2015/0048263 A1    Feb. 19, 2015

(30) Foreign Application Priority Data

Aug. 15, 2013    (CN) .......................... 2013 1 0356530

(51) Int. Cl.
| | |
|---|---|
| G21F 3/00 | (2006.01) |
| G01V 5/00 | (2006.01) |
| G21F 1/02 | (2006.01) |
| G21F 1/04 | (2006.01) |

(52) U.S. Cl.
CPC .............. *G21F 3/00* (2013.01); *G01V 5/0016* (2013.01); *G21F 1/023* (2013.01); *G21F 1/042* (2013.01)

(58) Field of Classification Search
USPC ...... 250/515.1, 517.1, 505.1; 378/57, 58, 62
See application file for complete search history.

(56) References Cited

U.S. PATENT DOCUMENTS

| | | | | |
|---|---|---|---|---|
| 2004/0213374 | A1* | 10/2004 | Kang .................. | G01V 5/0016 378/57 |
| 2009/0108216 | A1* | 4/2009 | Ichimura .................. | G21F 5/00 250/515.1 |
| 2011/0024639 | A1* | 2/2011 | Dazeley .................... | G01T 1/22 250/366 |

\* cited by examiner

*Primary Examiner* — Kiet T Nguyen
(74) *Attorney, Agent, or Firm* — Merchant & Gould P.C.

(57) ABSTRACT

A radiation protection device is disclosed in the embodiment of the present invention. The radiation protection device is used for a system which is configured to perform safety inspection of a cargo or a vehicle by a ray. The radiation protection device comprising: at least one container, and a radiation protection part disposed within the container. The radiation protection material may comprise at least one of concrete, sandstone, and water, or the radiation protection part may comprise a steel-lead protection wall or a concrete protection wall. With the radiation protection device according to the embodiment of the present invention, after the container is transported to the site, it can be directly put in place to be capable of shielding rays without needing operation or with only simple operation. The amount of on-site work, construction time, and construction cost are low.

14 Claims, 2 Drawing Sheets

RADIATION PROTECTION DEVICE

CROSS-REFERENCE TO RELATED APPLICATION

This application claims the benefit of Chinese Patent Application No. 201310356530.5 filed on Aug. 15, 2013 in the State Intellectual Property Office of China, the whole disclosure of which is incorporated herein by reference.

BACKGROUND OF THE INVENTION

1. Field of the Invention

The disclosure of the present invention relates to a radiation protection device and in particular to a radiation protection device for a system which is configured to perform safety inspection of a cargo or a vehicle by a ray.

2. Description of the Related Art

In a conventional cargo or vehicle inspection system, generally a ray such as an x-ray, a gamma ray and a neutron ray is adopted to inspect the cargo or vehicle under inspection. Radiation protective shielding facility often needs to be built to ensure that the system satisfies related laws and regulations. Radiation protective shielding facility has various forms and includes a cast-in-situ concrete wall, a precast concrete wall, a steel-lead protection wall or facility in other structural forms. These structures generally need to be constructed or assembled in situ. The construction period is long and the construction cost is high.

SUMMARY OF THE INVENTION

An object of an embodiment of the present invention is to provide a radiation protection device which can be built in situ quickly.

Another object of an embodiment of the present invention is to provide a radiation protection device so that the amount of on-site work, construction time, and construction cost can be reduced.

In accordance with an embodiment of the present invention, there is provided a radiation protection device for a system which is configured to perform safety inspection of a cargo or a vehicle by a ray, the radiation protection device comprising: at least one container, and a radiation protection part disposed within the container.

In accordance with an embodiment of the present invention, the radiation protection part comprises a case and a radiation protection material accommodated in the case.

In accordance with an embodiment of the present invention, the radiation protection material is filled into the case on site or at a site where the system is mounted.

In accordance with an embodiment of the present invention, the radiation protection material comprises at least one of concrete, sandstone, and water.

In accordance with an embodiment of the present invention, the radiation protection part comprises a protection wall such as a steel-lead protection wall or a concrete protection wall.

In accordance with an embodiment of the present invention, the radiation protection part comprises a protection wall, and the protection wall has a protection wall body and a flange portion extending from at least a portion of an edge of the protection wall body.

In accordance with an embodiment of the present invention, the radiation protection part comprises a protection wall, and the protection wall has a protection wall body and a flange portion extending from at least a portion of an edge of the protection wall body and forming a predetermined angle with the protection wall body.

In accordance with an embodiment of the present invention, the predetermined angle ranges from about 45 degrees to about 90 degrees.

In accordance with an embodiment of the present invention, the predetermined angle comprises about 90 degrees.

In accordance with an embodiment of the present invention, the flange portion protrudes towards a side of the protection wall body from at least one of an upper edge and a lower edge of the protection wall body.

In accordance with an embodiment of the present invention, the flange portion protrudes towards both sides of the protection wall body from at least one of a left edge and a right edge of the protection wall body.

In accordance with an embodiment of the present invention, the protection wall body has a substantially rectangular shape, and the flange portion protrudes towards at least one of both sides of the protection wall body from at least one of four side edges of the protection wall body.

In accordance with an embodiment of the present invention, the flange portion has a substantially flat shape.

In accordance with an embodiment of the present invention, the flange portion has a substantially plate shape.

In accordance with an embodiment of the present invention, the protection wall body has a substantially flat shape.

In accordance with an embodiment of the present invention, the protection wall body has a substantially plate shape.

In accordance with an embodiment of the present invention, the protection wall is integral, or composed of a plurality of separate elements.

In accordance with an embodiment of the present invention, the case comprises a single case which is placed in the container or a plurality of cases which are arranged together in the container.

With the radiation protection device according to the embodiment of the present invention, after the container is transported to the site, it can be directly put in place to be capable of shielding rays without needing operation or with only simple operation. The amount of on-site work, the construction time, and the construction cost are low.

DETAILED DESCRIPTION OF THE EMBODIMENTS

Figure 1:
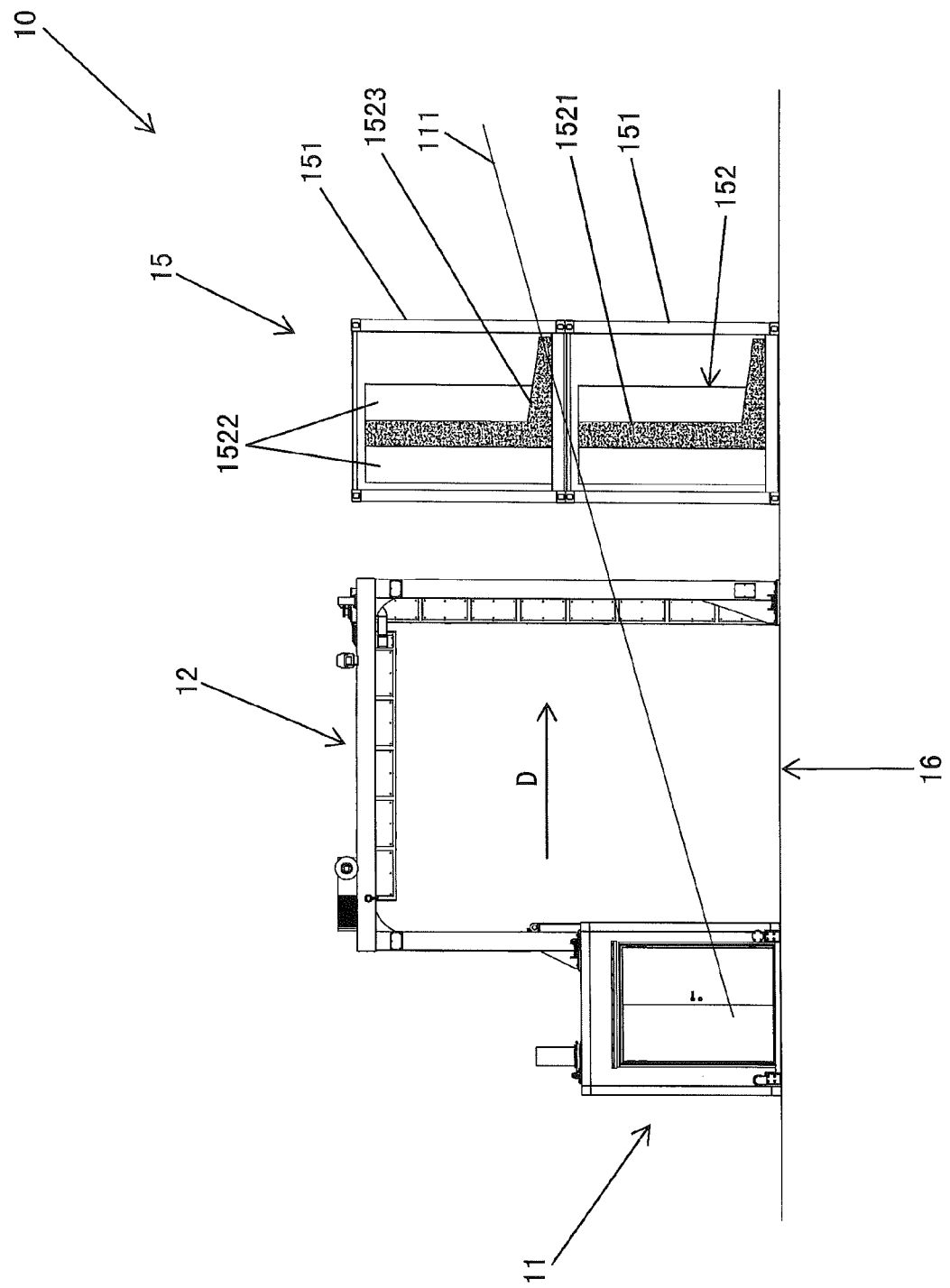
FIG. 1 is a schematic view of a radiation protection device for a system which is configured to perform safety inspection of a cargo or a vehicle by a ray according to an embodiment of the present invention.
Figure 2:
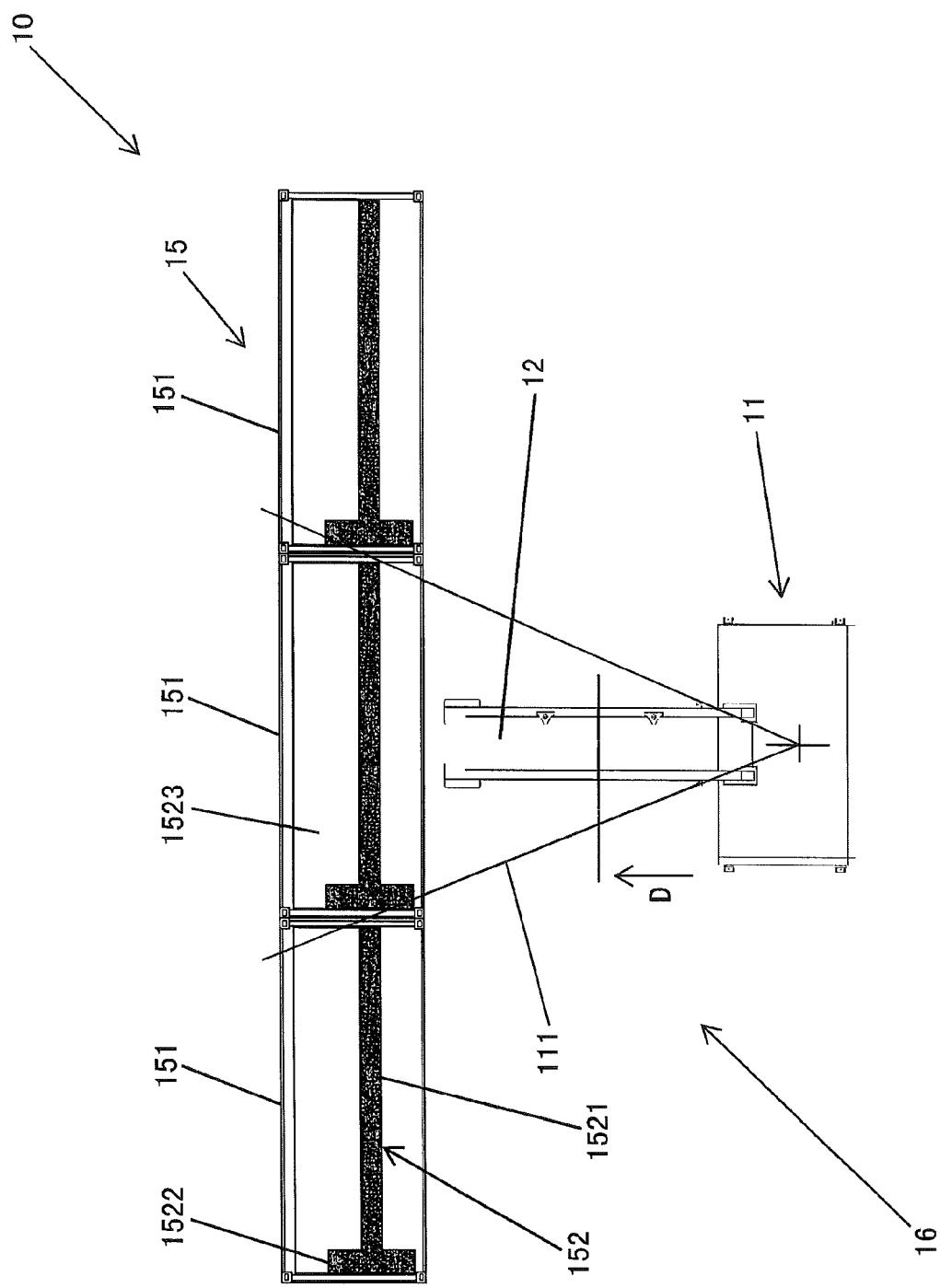
FIG. 2 is a schematic top view of the radiation protection device for a system which is configured to perform safety inspection of a cargo or a vehicle by a ray according to the embodiment of the present invention.

Referring to FIGS. 1 and 2, a system 10 configured to perform safety inspection of a cargo or a vehicle by a ray comprises a ray source 11 for emitting a ray 111 such as an x-ray, a gamma ray or a neutron ray and a detector 12 for receiving the ray 111 which has passed through an object under inspection. In FIGS. 1 and 2, the detector 12 is configured to detect the transmitted ray 111. However, a scattering detector such as a back scattering detector or a forward scattering detector may be also disposed to perform scattering inspection such as back scattering inspection and forward scattering inspection. Accordingly, the ray source 11 is disposed as a scattering ray source 11 such as a flying spot device.

Referring to FIGS. 1 and 2, the system 10 further comprises a radiation protection device 15 for preventing the ray 111 of more than a predetermined dose from being leaked into an environment surrounding the system 10. The radiation protection device 15 is put according to radiation protection requirements of the system 10. The system 10 may further comprise a passage 16. The ray 111 is used to perform safety inspection of the cargo or vehicle passing through the passage 16. For example, the radiation protection device 15 is put on at least one side of the passage 16, for example, on one side or both sides of the passage 16.

Referring to FIGS. 1 and 2, the radiation protection device 15 comprises: at least one container 151, and a radiation protection part 152 disposed within the container 151. The container 151 may be put on at least one side of the passage 16. A longitudinal direction of the container 151 may be substantially parallel to the passage 16. For example, one or more containers 151 may be disposed. The containers 151 may be overlapped in an up-down direction, juxtaposed in a left-right direction, or overlapped in the up-down direction and juxtaposed in the left-right direction.

The radiation protection part 152 may comprise a case and a radiation protection material accommodated in the case. The radiation protection material may comprise at least one of concrete, sandstone, and water. The radiation protection material may be filled into the case on site or at a site where the system is mounted. In addition, the case may have any appropriate shape, such as a shape of a protection wall described later, thereby forming a protection wall after the radiation protection material is filled in the case.

Referring to FIGS. 1 and 2, the radiation protection part 15 may comprise a protection wall 152 such as a steel-lead protection wall or a concrete protection wall. The protection wall 152 has a predetermined thickness, and may have a substantially flat shape or a substantially plate shape.

Referring to FIGS. 1 and 2, according to an embodiment of the present invention, the protection wall 152 may have a protection wall body 1521, and a flange portion 1522 and 1523 extending from at least a portion of an edge or the entire edge, or some or all of edges (such as an edge or edges close to an inner wall of the container) of the protection wall body 1521. The flange portion 1522 and 1523 forms a predetermined angle with the protection wall body 1521. The predetermined angle may range from about 45 degrees to about 90 degrees. For example, the predetermined angle may comprise about 90 degrees.

Referring to FIG. 1, in order to ensure that the ray is not leaked from an abutting portion where the containers abut against each other in the vertical direction when two or more layers of containers are put in the vertical direction, a bottom of the radiation protection wall within the container may be designed in a structure as shown in FIG. 1. Specifically, at a bottom or a top within the container, an additional radiation protection wall, i.e., the flange portion 1523, may be disposed in order to ensure that all of the rays passing through the abutting portion of the containers are attenuated through the additional radiation protection wall. Specifically, the flange portion 1523 protrudes towards one side or both sides of the protection wall body 1521 from at least one of an upper edge and a lower edge of the protection wall body 1521. For example, the ray is propagated from the ray source 11 towards the inspection passage 16 in a ray propagation direction D. The flange portion 1523 protrudes towards a downstream side, in the ray propagation direction D, of the protection wall body 1521 from at least one of the upper edge and the lower edge of the protection wall body 1521. Alternatively, the flange portion 1523 may protrude towards an upstream side or both the upstream and downstream sides, in the ray propagation direction D, of the protection wall body 1521 from at least one of the upper edge and the lower edge of the protection wall body 1521.

Referring to FIG. 2, in order to ensure that the ray is not leaked from an abutting portion where the containers abut against each other in a left-right direction when the containers are put in a horizontal direction, the radiation protection wall within the container may be designed in a structure as shown in FIG. 2. Specifically, at one end or both ends within the container, an additional radiation protection wall, i.e., the flange portion 1522, may be disposed in order to ensure that all of the rays passing through the abutting portion of the containers are attenuated through the additional radiation protection wall. Specifically, the flange portion 1522 protrudes towards both sides of the protection wall body 1521 from at least one of a left edge and a right edge of the protection wall body 1521. For example, the flange portion 1522 protrudes towards both the upstream side and the downstream side, in the ray propagation direction D, of the protection wall body 1521 from at least one of the left edge and the right edge, in the longitudinal direction of the container 151, of the protection wall body 1521. Alternatively, the flange portion 1522 may protrude towards the upstream side or the downstream side, in the ray propagation direction D, of the protection wall body 1521 from at least one of the left edge and the right edge of the protection wall body 1521.

In some embodiments, referring to FIGS. 1 and 2, the protection wall body 1521 may have a substantially rectangular shape, and the flange portion 1522 and 1523 may protrude towards at least one (such as one side or two sides) of both sides of the protection wall body 1521 from at least one (such as one, two, three, or all) of four side edges of the protection wall body 1521.

In some embodiments, referring to FIGS. 1 and 2, the flange portion 1522 and 1523 may have a substantially flat shape or a substantially plate shape, or any other appropriate shape. The protection wall body 1521 may have a substantially flat shape or a substantially plate shape, or any other appropriate shape.

Referring to FIGS. 1 and 2, the protection wall 152 may he integral or a one-piece wall. Alternatively, the protection wall 152 is composed of a plurality of separate elements arranged together. For example, adjacent portions of the elements adjacent to each other may have a recess and a protrusion, respectively. The adjacent portions are overlapped by engaging the protrusion with the recess. Alternatively, the adjacent portions of the elements adjacent to each other may be directly put to overlap each other, or may directly abut against each other. For example, a normal of an abutting surface of the adjacent portions may be substantially parallel to the ray 111 irradiated to the abutting surface, or forman angle of less than about 45 degrees with the ray 111 irradiated to the abutting surface. In some embodiments, all or some of the elements may have the structure of the protection wall 152. The elements may be placed on a support by disposing the support, directly arranged together, or fixed together.

In some embodiments, the flange portions 1522 and 1523 and the protection wall body 1521 are separate elements, respectively. The protection wall body 1521 may be integral or a one-piece wall, or composed of a plurality of separate elements. For example, adjacent portions of the elements adjacent to each other may have a recess and a protrusion, respectively. The adjacent portions are overlapped by engaging the protrusion with the recess. Alternatively, the adjacent portions of the elements adjacent to each other may be directly put to overlap each other, or may directly abut against each other. For example, a normal of an abutting surface of the adjacent portions may be substantially parallel to the ray 111 irradiated to the abutting surface, or forman angle of less than about 45 degrees with the ray 111 irradiated to the abutting surface.

Similarly, within the container 151, a single case may be placed, or a plurality of cases may be arranged together. The plurality of cases may be placed on a support by disposing the support, directly arranged together, or fixed together. As described above, the case may has the structure of the protection wall 152. In other words, the protection wall 152 is made as one or more cases into which the radiation protection material is filled.

In some embodiments, normals of surfaces, irradiated by the ray 111, of the flange portions 1522 and 1523 and the protection wall body 1521 are substantially parallel to the ray 111 irradiated to the surfaces, or forman angle of less than about 45 degrees with the ray 111 irradiated to the surfaces. The flange portions 1522 and 1523 and the protection wall body 1521 may be disposed according to distribution of the sectorial ray beam or cone-shaped ray beam. Thereby, the normals of the surfaces, irradiated by the ray 111, of the flange portions 1522 and 1523 and the protection wall body 1521 are substantially parallel to the ray 111 irradiated to the surfaces, or forman angle of less than about 45 degrees with the ray 111 irradiated to the surfaces.

In the longitudinal direction of the container 151, a section, in the vertical direction, of the protection wall 152 or the case within one container 151 is substantially equal to or slightly less than a section, in the vertical direction, of a chamber within the one container 151.

It should be noted that while the embodiments of the present invention have been described in conjunction with the accompanying drawings, the present invention is not limited to the embodiments. For example, some of the abovementioned features may be combined into other embodiments unless they are in conflict with each other. The various possible combinations will not be listed for the sake of brevity.

The invention claimed is:

1. A radiation protection device for a system which is configured to perform safety inspection of a cargo or a vehicle by a ray, the radiation protection device comprising:
   a plurality of containers, and
   a radiation protection part disposed within each of the container,
   wherein:
   the radiation protection part comprises a protection wall, and the protection wall has a protection wall body and a flange portion extending from at least a portion of an edge of the protection wall body, and
   the plurality of containers comprises a first container and a second container adjacent to each other, and the flange portion of the radiation protection part within the first container is configured to be adjacent to a first wall of the first container, and the first wall abuts a second wall of the second container, so that the flange portion lies in the path of at least one ray which would otherwise pass obliquely through the abutting first wall of the first container and second wall of the second container.

2. The radiation protection device of claim 1, wherein: the flange portion forms a predetermined angle with the protection wall body.

3. The radiation protection device of claim 2, wherein: the predetermined angle ranges from about 45 degrees to about 90 degrees.

4. The radiation protection device of claim 2, wherein: the predetermined angle comprises about 90 degrees.

5. The radiation protection device of claim 4, wherein: the protection wall body has a substantially rectangular shape, and the flange portion protrudes towards at least one of opposite sides, in a direction perpendicular to the protection wall body, of the protection wall body from at least one of four side edges of the protection wall body.

6. The radiation protection device of claim 1, wherein: the flange portion protrudes towards a side, in a direction perpendicular to the protection wall body, of the protection wall body from at least one of an upper edge and a lower edge of the protection wall body.

7. The radiation protection device of claim 6, wherein: the flange portion further protrudes towards opposite sides, in the direction perpendicular to the protection wall body, of the protection wall body from at least one of a left edge and a right edge of the protection wall body.

8. The radiation protection device of claim 1, wherein: the flange portion protrudes towards opposite sides, in a direction perpendicular to the protection wall body, of the protection wall body from at least one of a left edge and a right edge of the protection wall body.

9. The radiation protection device of claim 1, wherein: the protection wall body has a substantially rectangular shape, and the flange portion protrudes towards at least one of opposite sides, in a direction perpendicular to the protection wall body, of the protection wall body from at least one of four side edges of the protection wall body.

10. The radiation protection device of claim 1, wherein: the flange portion has a substantially flat shape.

11. The radiation protection device of claim 1, wherein: the flange portion has a substantially plate shape.

12. The radiation protection device of claim 1, wherein: the protection wall body has a substantially flat shape.

13. The radiation protection device of claim 1, wherein: the protection wall body has a substantially plate shape.

14. The radiation protection device of claim 1, wherein: the protection wall is integral or a one-piece wall, or composed of a plurality of separate elements.

* * * * *